United States Patent
Podkanski et al.

[11] Patent Number: 5,803,234
[45] Date of Patent: Sep. 8, 1998

[54] ROLLER DRIVE SYSTEM FOR VEHICLE CONVEYOR

[75] Inventors: Tadeusz Podkanski, Anaheim; Michael Graf, Lomita, both of Calif.

[73] Assignee: Ancra International Corporation, Hawthorne, Calif.

[21] Appl. No.: 609,195

[22] Filed: Mar. 1, 1996

[51] Int. Cl.[6] .................................................. B65G 13/12
[52] U.S. Cl. ............................................................ 198/782
[58] Field of Search ...................................... 198/780, 782, 198/788, 789; 244/137.1; 414/531, 532, 535

[56] References Cited

U.S. PATENT DOCUMENTS

| | | |
|---|---|---|
| 4,697,694 | 10/1987 | Huber . |
| 4,792,037 | 12/1988 | Huber . |
| 5,033,611 | 7/1991 | Huber . |
| 5,042,645 | 8/1991 | Pritchard . |
| 5,127,513 | 7/1992 | Huber . |
| 5,131,527 | 7/1992 | Hiber ..................................... 198/782 |
| 5,215,184 | 6/1993 | Huber . |
| 5,437,585 | 8/1995 | Sundseth . |
| 5,547,069 | 8/1996 | Pritchard ................................. 198/782 |

*Primary Examiner*—James R. Bidwell
*Attorney, Agent, or Firm*—Edward A. Sokolski

[57] ABSTRACT

A roller assembly including a roller and a support frame is removably mounted in a carrier attached to the floor of a vehicle. The roller is raised to an extended position so as to abut against a cargo unit load device when a roller drive system is activated and subsequently automatically lowered to a retracted position within the carrier when this system is deactivated. The roller is rotatably mounted on a support frame. Also mounted on this support frame is a DC motor which has an eccentric arm attached to its drive shaft. When the roller drive system is electrically activated, the DC motor as well as the roller drive motor are both activated, with the DC motor driving its arm against a post member to bring the frame to its extended position in the carrier. In this position, the roller is urged upwardly in abutment against the cargo unit load device. A capacitor is fully charged while the motors are activated. When the roller drive is deactivated, the capacitor is automatically connected to the DC motor to drive it in a reverse direction with the eccentric arm being rotated to permit the roller to fall to its retracted position.

11 Claims, 2 Drawing Sheets

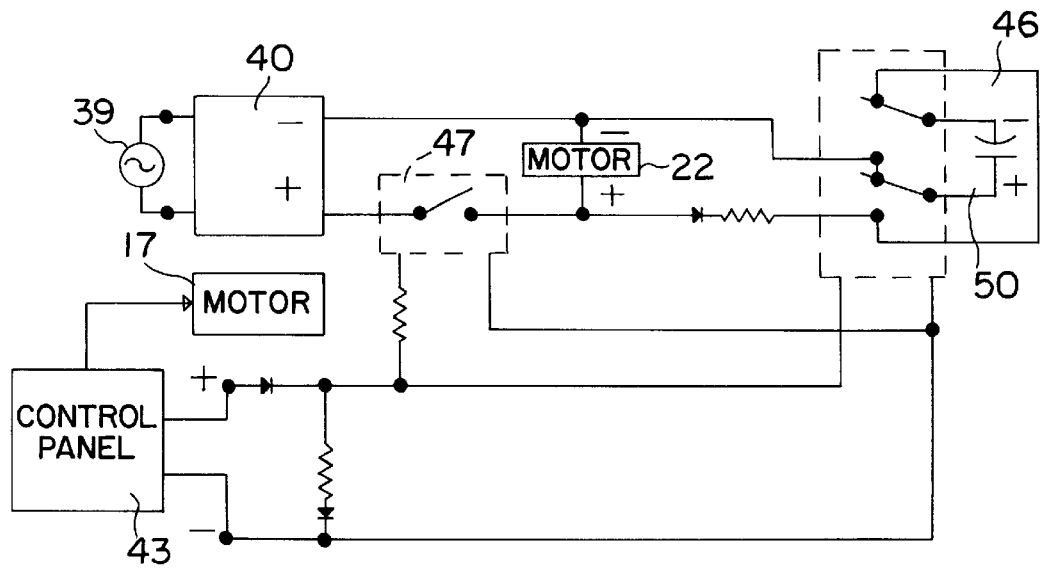
F I G. 5
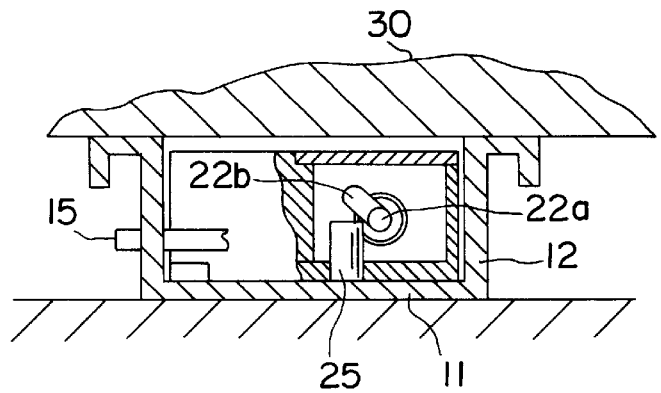
F I G. 4A
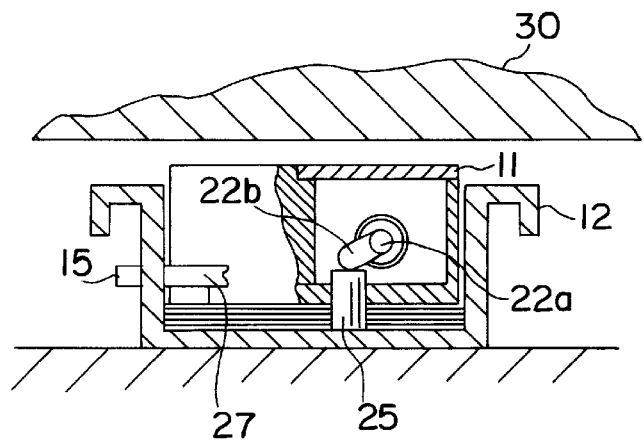
F I G. 4B

ROLLER DRIVE SYSTEM FOR VEHICLE CONVEYOR

BACKGROUND OF THE INVENTION

1. Field of the Invention

This invention relates to cargo conveying systems for use in moving cargo on a vehicle such as an aircraft and more particularly to a roller drive system which is urged upwardly against cargo to be conveyed when the system is activated and retracted when the system is deactivated.

2. Description of the Related Art

Roller assemblies which are removably mounted on carriers attached to the floor of a vehicle such as an aircraft or truck are widely used for conveying cargo in such vehicles. With some of the prior art assemblies such as those described in U.S. Pat. No. 5,437,585 issued Aug. 1, 1995 to Sundseth, U.S. Pat. No. 4,697,694 issued Oct. 6, 1987 to Huber, and U.S. Pat. No. 5,042,645 issued Aug. 27, 1991 to Pritchard, mechanisms are provided to drive the drive roller upwardly in abutment against the cargo unit load device. In such systems, when the conveying operation has been completed, the drive roller is retracted so that it will no longer abut against the unit load device and permit movement thereof unhampered by the roller. Such systems generally involve relatively complicated mechanisms which are both costly and difficult to repair or replace. The system of the present invention obviates the above indicated shortcomings in provided a simple mechanism for elevating and retracting a drive roller which is relatively easy to repair and replace.

BRIEF SUMMARY OF THE INVENTION

In the roller drive system of the present invention, when the drive motor which drives the roller is activated, a second motor which operates on DC is also activated. This second motor has an eccentric arm attached to its drive shaft. The two motors and the roller are supported on a frame which is mounted in a carrier for limited slidable vertical movement relative thereto. When activated, the eccentric drive shaft of the motor is driven against a post mounted on the floor of the carrier, thereby extending the frame upwardly bringing the roller rotatably mounted thereon into driving abutment against a cargo unit load device supported on the carrier. While the two motors are activated, a high capacitance capacitor is fully charged.

After the cargo unit load device has been positioned as desired, the two motors are deactivated. When the motors are deactivated the charged capacitor is automatically connected to the second motor in a polarity such as to drive the motor in a reverse direction. With such reverse rotation the eccentric arm is rotated away from the post so as to permit the frame and roller to return to their retracted position in the carrier.

It is therefore an object of the invention to facilitate the positioning of a conveyer roller between retracted and extended positions.

It is a further object of the invention to provide an improved system for driving a roller between extended and retracted positions.

Other objects of the invention will become apparent in connection with the following description in conjunction with the accompanying drawings.

BRIEF DESCRIPTION OF THE DRAWINGS

FIG. 4A is cross sectional view taken along the plane indicated by 4A—4A in FIG. 3 showing the frame in its retracted position;

FIG. 4B is a cross sectional view taken along the plane indicated by 4A—4A in FIG. 3 showing the frame in its extended position; and FIG. 5 is a schematic drawing showing the control system of the preferred embodiment.

DETAILED DESCRIPTION OF THE INVENTION

Figure 1:
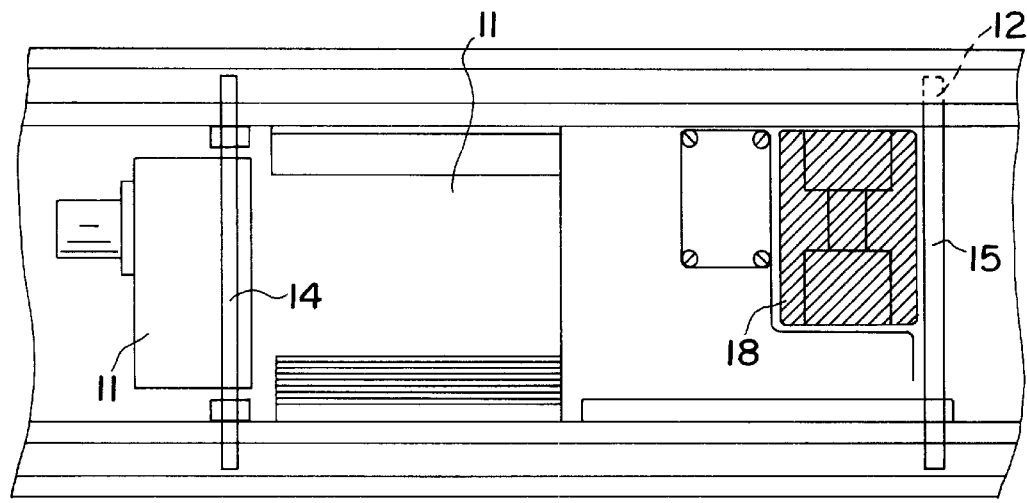
FIG. 1 is a top plan view of a preferred embodiment of the invention.
Figure 2:
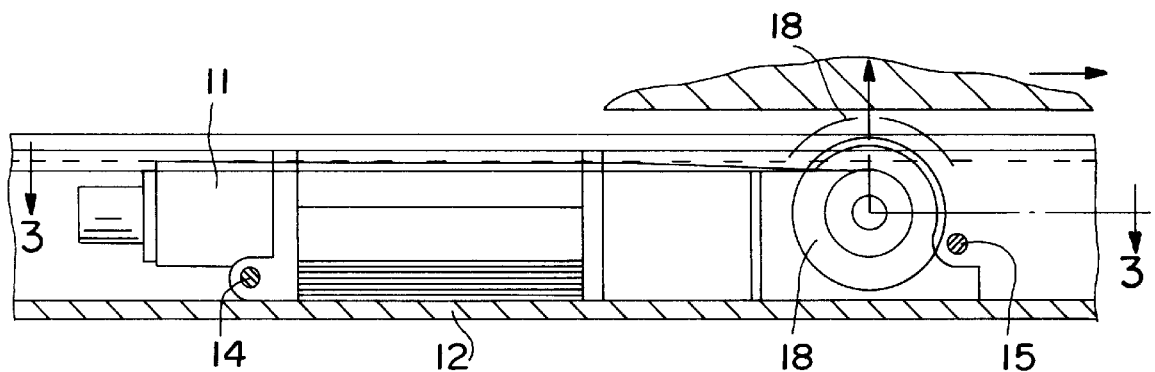
FIG. 2 is a front elevational view of the preferred embodiment.
Figure 3:
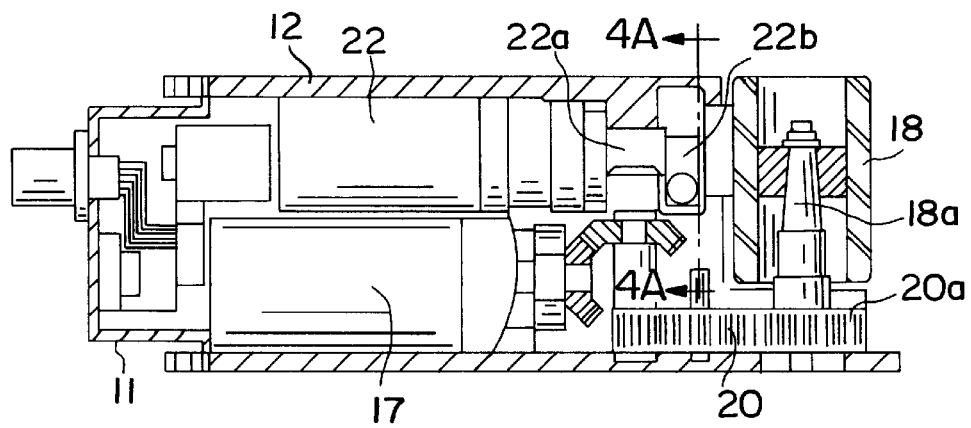
FIG. 3 is a cross sectional taken as indicated by 3—3 in FIG. 2.

Referring to FIGS. 1–3,4A and 4B, the preferred embodiment of the invention is shown.

Frame 11 is mounted for limited vertical motion in carrier 12 by means of pins 14 and 15 which fit through apertures formed in the sides of the carrier and extend across the carrier. Frame 11 is pivotally supported on pin 14 which is mounted on the carrier while pin 15 blocks motion of the frame except for limited vertical motion as can best be seen in FIGS. 4A and 4B. The frame can readily be removed from the carrier by sliding pins 14 and 15 out of the carrier.

Roller drive motor 17 rotatably drives roller through gear train 20, the output gear 20a of which is attached to the drive shaft 18a of roller 18. Elevation motor 22 is mounted on frame 11. Motor 22 is a DC motor having a gear train (not shown) and an output shaft 22a with an eccentric arm 22b attached thereto.

As to be explained more fully in connection with FIG. 5, when motor 22 is initially activated, arm 22b is driven from the position shown in FIG. 4A to that shown in FIG. 4B. A post 25, which may be in the form of a spring urged plunger to provide some cushioning, is mounted on the floor of carrier 12. Arm 22b is driven against post 25 to bring frame 11 to the extended position of FIG. 4B. Further upward movement of the frame is limited by means of stop member 27, attached to the floor of the frame, which abuts against pin 15 mounted on the carrier. Thus, cargo unit load device 30 is supported on roller 18 in the roller extended position of FIG. 4B and may rest on the carrier 12 in the roller retracted position of FIG. 4A.

Referring now to FIG. 5, the electrical control system of the invention is schematically illustrated. Control panel 43 controls the supply of power to motor 17 which is typically an AC motor. The relay contacts are shown in FIG. 5 with the relays not energized. The control panel also controls the supply of DC control voltage to energize relays 46 and 47. A switch (not shown) in control panel 43 is thrown to start motor 17 and to energize relays 46 and 47. The output of AC power source 39 is rectified in power supply 40 to provide DC to motor 22 in the indicated polarity. At the same time, DC is connected through the contacts of relays 46 and 47 to capacitor 50 to charge the capacitor in the indicated polarity. Capacitor 50 has a high capacitance (about 350 mfd). Motor 22, as previously explained, has an eccentric arm 22b which is driven against post 25 thereby bringing the roller to the extended position as shown in FIG. 4A. Motor 22 retains the roller in this extended position as long as it is actuated. The control switch on the control panel is thrown to the "off" position to terminate the operation of motor 17 and the roller and to bring relays 46 and 47 to the de-energized position (as shown in FIG. 5). Charged capacitor 50 is now placed across the terminals of motor 22 so that it discharges through the motor to provide driving current which drives the motor in a reverse direction. This brings the arm 22b to the position shown in FIG. 4A permitting the frame 11 to drop to its retracted position. In lieu of relays 46 and 47, electronic switching circuits may be employed.

While the invention has been described and illustrated in detail, it is to be clearly understood that this is intended by way of example only and is not to be taken by way of limitation, the scope of the invention being limited only by the terms of the following claims.

We claim:

1. A roller drive system for conveying cargo along the floor of a vehicle comprising:

a carrier attached to said vehicle floor;

a support frame removably mounted in said carrier for limited slidable vertical movement substantially normal to the longitudinal axis of said carrier;

first motor means for rotatably driving said roller, said first motor means comprising a motor which is first driven in a forward direction;

second motor means for driving said frame vertically relative to said carrier;

means for simultaneously providing power to said first and second motor means to effect rotation of said roller means by said fist motor means and to cause said second motor means to drive said frame from a retracted position within the carrier to an extended position with the roller in driving abutment against the cargo; and means for simultaneously removing power from said first motor means and providing power to said second motor means to drive said second motor means in a reverse direction to bring the frame and the roller to said retracted position, said means for providing power to drive said second motor means in a reverse direction comprising a capacitor and relay means for connecting said capacitor to said means for providing power to said second motor means to effect the charging thereof and for subsequently connecting said capacitor to said second motor means in a polarity to effect rotation thereof in a reverse direction.

2. The roller drive system of claim 1 wherein said second motor means comprises a motor having a drive shaft with an eccentric arm thereon, and a post mounted on said carrier, said arm abutting against said post with rotation of said drive shaft to bring the frame to the extended position.

3. The roller drive system of claim 2 wherein said first motor means comprises a motor which is first driven in a forward direction, said means for providing power to drive said second motor means in a reverse direction comprising a capacitor and relay means for connecting said capacitor to said means for providing power to said second motor means to effect the charging thereof and for subsequently connecting said capacitor to said second motor means in a polarity to effect rotation thereof in a reverse direction.

4. A roller drive system for conveying cargo along the floor of a vehicle comprising:

a carrier attached to said vehicle floor;

a support frame removably mounted in said carrier for limited slidable vertical movement substantially normal to the longitudinal axis of said carrier;

first motor means for rotatably driving said roller;

second motor means for driving said frame vertically relative to said carrier;

means for simultaneously providing power to said first and second motor means to effect rotation of said roller means by said first motor means and to cause said second motor means to drive said frame from a retracted position within the carrier to an extended position with the roller in driving abutment against the cargo; and means for simultaneously removing power from said first motor means and providing power to said second motor means to drive said second motor means in a reverse direction to bring the frame and the roller to said retracted position.

5. The roller drive system of claim 4 and further including means extending through said carrier for removably mounting the support frame in the carrier.

6. The roller drive system of claim 5 wherein the means for mounting the support frame in the carrier comprises a pair of pins which extend through the carrier and limit movement of said support frame.

7. A roller drive system for conveying cargo along the floor of a vehicle comprising:

a carrier attached to said vehicle floor;

a support frame removably mounted in said carrier for limited slidable vertical movement substantially normal to the longitudinal axis of said carrier;

first motor means for rotatably driving said roller;

second motor means for driving said frame vertically relative to said carrier;

a capacitor; and means for simultaneously removing power from said first motor means and providing power from said capacitor to said second motor means to drive said second motor means in a reverse direction to bring the frame and the roller to said retracted position.

8. The roller drive system of claim 7 wherein said second motor means comprises a motor having a drive shaft with an eccentric arm thereon, and a post mounted in said carrier, said arm abutting against said post with rotation of said drive shaft to bring the frame to the extended position.

9. The roller drive system of claim 7 wherein said means for charging the capacitor and for providing power from the capacitor to the second motor means comprises relay means for connecting said capacitor to said means for providing power to said second motor means to effect the charging thereof and for subsequently connecting said capacitor to said second motor means in a polarity to effect rotation thereof in a reverse direction.

10. The roller drive system of claim 7 and further including means extending through said carrier for removably mounting the support frame in the carrier.

11. The roller drive system of claim 10 wherein the means for mounting the support frame in the carrier comprises a pair of pins which extend through the carrier and limit movement of said support frame.

* * * * *